US009155078B2

(12) United States Patent
Sundberg et al.

(10) Patent No.: US 9,155,078 B2
(45) Date of Patent: Oct. 6, 2015

(54) MULTIRECEIVER TIMING ADVANCE PROVISIONING

(71) Applicant: TELEFONAKTIEBOLAGET L M ERICSSON (PUBL), Stockholm (SE)

(72) Inventors: Marten Sundberg, Arsta (SE); Paul Schliwa-Bertling, Ljungsbro (SE); John Walter Diachina, Garner, NC (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 169 days.

(21) Appl. No.: 13/854,217

(22) Filed: Apr. 1, 2013

(65) Prior Publication Data
US 2013/0279482 A1     Oct. 24, 2013

Related U.S. Application Data

(60) Provisional application No. 61/635,602, filed on Apr. 19, 2012.

(51) Int. Cl.
*H04W 72/04* (2009.01)
*H04W 56/00* (2009.01)
*H04W 76/02* (2009.01)

(52) U.S. Cl.
CPC ...... *H04W 72/0406* (2013.01); *H04W 56/0005* (2013.01); *H04W 56/0045* (2013.01); *H04W 76/021* (2013.01)

(58) Field of Classification Search
None
See application file for complete search history.

(56) References Cited

U.S. PATENT DOCUMENTS

| 6,449,290 | B1 * | 9/2002 | Willars et al. | 370/507 |
| 6,452,940 | B1 * | 9/2002 | Yared et al. | 370/465 |
| 6,804,212 | B1 * | 10/2004 | Vallstrom et al. | 370/331 |
| 2001/0030949 | A1 * | 10/2001 | Molno et al. | 370/329 |

(Continued)

FOREIGN PATENT DOCUMENTS

| EP | 2343935 A2 | 7/2011 |
| WO | WO 2011/068367 A2 | 6/2011 |

OTHER PUBLICATIONS

3GPP TS 44.060 V11.0.0, 3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 11), GP-53, dated Mar. 16, 2012, the whole document.

(Continued)

*Primary Examiner* — Jackie Zuniga Abad
*Assistant Examiner* — Lakeram Jangbahadur

(57) ABSTRACT

A method of operating a mobile station in a packet transfer mode includes receiving a distribution timing advance message on a control channel from a base station. The distribution timing advance message contains a plurality of mobile station identifiers and associated timing advance values. One of the mobile station identifiers is identified as corresponding to the mobile station. The timing advance value associated with the identified one of the mobile station identifiers is determined. The timing of an uplink transmission to the base station is then adjusted responsive to the timing advance value. Related mobile stations, methods of operating a base station subsystem to communicate timing advance values to a plurality of mobile stations, base station subsystems, and methods of operating a serving GPRS support node to control communication of timing advance values by a base station subsystem are also disclosed.

20 Claims, 7 Drawing Sheets

(56) References Cited

U.S. PATENT DOCUMENTS

| | | | |
|---|---|---|---|
| 2002/0028687 A1* | 3/2002 | Sato et al. | 455/466 |
| 2002/0196781 A1* | 12/2002 | Salovuori | 370/352 |
| 2003/0123471 A1* | 7/2003 | Menzel et al. | 370/442 |
| 2005/0053099 A1* | 3/2005 | Spear et al. | 370/508 |
| 2007/0254656 A1* | 11/2007 | Dalsgaard | 455/435.1 |
| 2007/0293157 A1* | 12/2007 | Haartsen et al. | 455/67.11 |
| 2008/0095119 A1* | 4/2008 | Bachmann et al. | 370/332 |
| 2009/0075669 A1* | 3/2009 | Franceschini et al. | 455/452.2 |
| 2009/0111445 A1* | 4/2009 | Ratasuk et al. | 455/418 |
| 2010/0254356 A1* | 10/2010 | Tynderfeldt et al. | 370/336 |
| 2011/0182280 A1* | 7/2011 | Charbit et al. | 370/350 |
| 2011/0222475 A1* | 9/2011 | Hole et al. | 370/328 |
| 2011/0222492 A1* | 9/2011 | Borsella et al. | 370/329 |
| 2011/0223932 A1* | 9/2011 | Hole et al. | 455/456.1 |
| 2012/0014371 A1* | 1/2012 | Weng et al. | 370/350 |
| 2012/0178482 A1* | 7/2012 | Seo et al. | 455/501 |
| 2012/0257614 A1* | 10/2012 | Chin et al. | 370/342 |
| 2014/0029586 A1* | 1/2014 | Loehr et al. | 370/336 |
| 2014/0071856 A1* | 3/2014 | Brisebois et al. | 370/255 |

OTHER PUBLICATIONS

3GPP TS 45.010 V10.1.0, 3rd Generation Partnership Project; Technical Specification Group GSM/EDGE Radio Access Network; Radio subsystem synchronization (Release 10) dated Apr. 2, 2011, the whole document.

\* cited by examiner

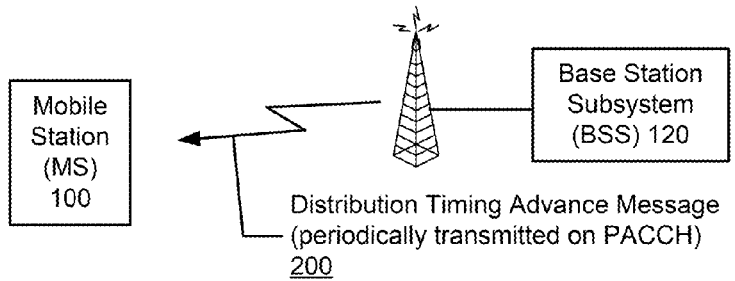

Distribution Timing Advance Message
(periodically transmitted on PACCH)
200

Figure 2

```
< Distribution Timing Advance message content > ::=
    < PAGE MODE : bit(2)>
    < Number_of_UPLINK_TFIs : bit (4) >
    {< UPLINK_TFI : bit (5) >
    < TIMING_ADVANCE_VALUE : bit (6) >} * (val(Number_of_UPLINK_TFIs)+1);
```

Figure 3

```
< Distribution Timing Advance message content > ::=
    < PAGE MODE : bit(2)>
    < Number_of_UPLINK_TFIs = N >
        UPLINK_TFI_MS_1; TIMING_ADVANCE_VALUE_1
        UPLINK_TFI_MS_2; TIMING_ADVANCE_VALUE_2
        ...
        UPLINK_TFI_MS_N; TIMING_ADVANCE_VALUE_N
```

Figure 4

MULTIRECEIVER TIMING ADVANCE PROVISIONING

CROSS REFERENCE TO RELATED APPLICATION

The present application claims the benefit of priority from U.S. Provisional Patent Application No. 61/635,602 filed Apr. 19, 2012, entitled "Multireceiver Timing Advance Provisioning," the disclosure of which is hereby incorporated herein in its entirety by reference.

TECHNICAL FIELD

The present disclosure is directed to wireless communications and, more particularly, to network access methods and related mobile stations and base station subsystems that provide timing advance values to multiple mobile stations.

BACKGROUND

In a typical cellular radio system, mobile stations (MSs), also referred to as user equipment nodes (UEs) and/or wireless terminals, communicate via a radio access network (RAN) with one or more core networks. The RAN covers a geographical area which is divided into cell areas, with each cell area being served by a base station subsystem (BSS), which is also referred to as a radio base station, base station, RAN node, a "NodeB", and/or enhanced NodeB "eNodeB. A cell area is a geographical area where radio coverage is provided by the BSS equipment at a BSS site. A BSS communicates through wireless radio communication channels with MSs within range of the BSS.

A MS communicating with a BSS transmits an access request over a random access channel when the MS has data for transmission to the BSS, and responsive to the access request, the BSS transmits an assignment message identifying uplink resources that have been allocated for the MS uplink data transmission(s).

All MSs must have a valid Timing Advance (TA) value in order to be allowed to transmit radio blocks on the assigned uplink resources to the network. The 3GPP TS 44.060 specification states that "Initial timing advance may be provided in the PACKET UPLINK ASSIGNMENT in the TIMING_ADVANCE_VALUE field". The 3GPP TS 44.018 specification states that the Immediate Assignment message includes a mandatory "Timing Advance" Information Element, IE, which provides initial timing advance information to a MS.

Thereafter, either the timing advance is updated with a PACKET POWER CONTROL/TIMING ADVANCE message or a continuous timing advance procedure is used. If a Timing Advance Index is included in the assignment message, the MS shall use the continuous timing advance procedure, using its allocation on Packet Timing advance Control Channel, PTCCH, (see 3GPP TS 45.010).

A MS is not allowed to send normal bursts on the uplink of an assigned radio resource unless it periodically receives valid TA values in a dedicated message (i.e. sent individually to each MSs) consisting of the 3GPP TS 44.060 PACKET POWER CONTROL/TIMING ADVANCE message.

As the number of mobile stations admitted to utilize a given set of radio resources is increased, the process for periodically sending dedicated 3GPP TS 44.060 PACKET POWER CONTROL/TIMING ADVANCE messages will result in increased radio resource consumption in support of the control plane communications. Consequently, the amount of radio resources that are available for user plane transfers will decrease and overall radio resource utilization efficiency will similarly decrease.

SUMMARY

Wireless system operators seek continued improvements to the radio resource utilization efficiency of the systems and, relatedly, seek to increase the number of mobile stations that can be assigned to shared radio resources. Radio resource utilization efficiency may be improved by reducing the amount of signaling (control plane communications) required to support a set of assigned mobile stations. The radio resource utilization efficiency can be calculated as the amount of transmitted user plane data in octets using a given set of allocated resources divided by the total number of octets transmitted using the same set of allocated resources measured over some period of time.

One embodiment disclosed herein is directed to a method of operating a mobile station in a packet transfer mode. The method includes receiving a distribution timing advance message on a control channel from a base station. The distribution timing advance message contains a plurality of mobile station identifiers and associated timing advance values. One of the mobile station identifiers is identified as corresponding to the mobile station. The timing advance value associated with the identified one of the mobile station identifiers is determined. The timing of an uplink transmission to the base station is then adjusted responsive to the timing advance value.

The method may thereby reduce the volume of control plane message transmissions that are needed to provide timing advance values to a plurality of mobile stations, such as mobile stations that have an ongoing uplink temporary block flow (TBF) but do not have any outstanding Radio Link Control (RLC) data blocks (and therefore do not need to receive a legacy type control plane message that provides Ack/Nack information for a single mobile station where said legacy type control plane message is also capable of providing timing advance information). This reduction in control plane transmissions may enable an increased number of user plane radio block transmissions and thereby improve radio resource utilization efficiency.

In a further embodiment, a TBF assignment message is received from the base station on a packet associated control channel. The TBF assignment message assigns an uplink temporary block flow (TBF) to the mobile station. Data packets (known as LLC PDUs) that are available in an uplink queue are transmitted from the mobile station to the base station using the uplink TBF. The mobile station completes the transfer of all available data packets and monitors the downlink packet associated control channel for arrival of the distribution timing advance message. The mobile station receives a distribution timing advance message on the packet associated control channel from the base station. The distribution timing advance message contains a mobile station identifier corresponding to the mobile station and identifies the associated timing advance value. The mobile station determines that a new packet is available in the uplink queue, and determines the timing to be used for transmission of the new data packet to the base station responsive to the timing advance value from the distribution timing advance message. The mobile station transmits the new data packet to the base station using the uplink TBF and the timing advance determined for transmission of the new data packet.

Another embodiment disclosed herein is directed to a mobile station that includes at least one processor and at least one memory coupled to the at least one processor. The at least one memory includes computer readable program code embodied in the at least one memory that when executed by the at least one processor causes the at least one processor to perform operations that include receiving a distribution timing advance message from a base station. The distribution timing advance message contains a plurality of mobile station identifiers and associated timing advance values. One of the mobile station identifiers is identified as corresponding to the mobile station. The timing advance value associated with the identified one of the mobile station identifiers is determined. The timing of an uplink transmission to the base station is adjusted responsive to the timing advance value.

Another embodiment disclosed herein is directed to a method of operating a base station subsystem to communicate timing advance values to a plurality of mobile stations. The method includes obtaining timing advance values for the plurality of mobile stations. A distribution timing advance message containing a plurality of mobile station identifiers for the plurality of mobile stations and the corresponding timing advance values is generated. The distribution timing advance message is communicated to the plurality of mobile stations.

Another embodiment disclosed herein is directed to a base station subsystem that includes at least one processor and at least one memory coupled to the at least one processor. The at least one memory includes computer readable program code embodied in the at least one memory that when executed by the at least one processor causes the at least one processor to perform operations that include obtaining timing advance values for a plurality of mobile stations. A distribution timing advance message is generated which contains a plurality of mobile station identifiers for the plurality of mobile stations and the corresponding timing advance values. The distribution timing advance message is communicated to the plurality of mobile stations.

Another embodiment disclosed herein is directed to a method of operating a serving GPRS support node to control communication of timing advance values by a base station subsystem to a plurality of mobile stations. The method includes receiving a message from a mobile station. A determination is made that the message contains a value indicating that the mobile station has a defined capability to determine a timing advance value from a distribution timing advance message containing a plurality of mobile station identifiers and associated timing advance values. A control message is communicated from the SGSN to the base station subsystem that indicates that the mobile station has the defined capability.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIG. 2 is a simplified block diagram of a portion of the cellular radio communications system of FIG. 1 and further illustrates a distribution timing advance message configured according to some embodiments;

FIGS. 3 and 4 illustrate example distribution timing advance messages according to some embodiments;

DETAILED DESCRIPTION

Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. It is also noted that these embodiments are not mutually exclusive. Components from one embodiment may be tacitly assumed to be present/used in another embodiment.

Figure 1:
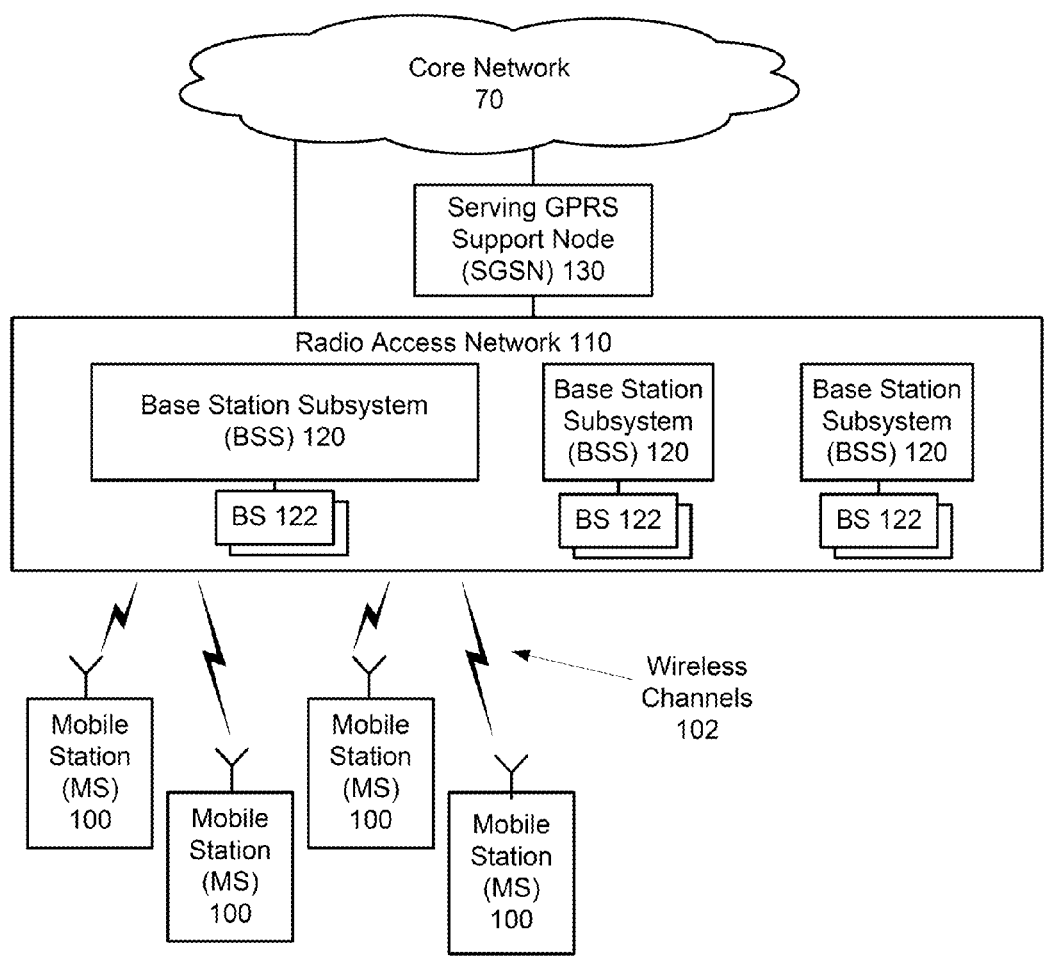
FIG. 1 is a block diagram of a cellular radio communications system that is configured according to some embodiments.

FIG. 1 is a block diagram of a cellular radio communications system that is configured according to some embodiments. The present inventive concepts are not limited to the embodiments of FIG. 1, as they may be embodied generally in any type of wireless communication network.

Mobile stations (MSs) 100, also referred to as user equipment nodes (UEs) and/or wireless terminals, communicate via a radio access network (RAN) 110 with one or more core networks 70. As used herein, a MS 100 can include any device that communicates through a wireless channels 102 with a communication network, and may include, but is not limited to, a mobile telephone ("cellular" telephone), laptop computer, tablet computer, desktop computer, game console, and/or a machine-type communications (MTC) device.

As explained above, the RAN 110 covers a geographical area which is divided into cell areas, with each cell area being served by a base station subsystem (BSS) 120 which communicates through the base stations (BSs) 122 via wireless channels 102 with the MSs 100. A MS 100 communicating with a BSS 120, via a BS 122, transmits an access request over a random access channel when the MS 100 has data for transmission to the BSS 120. Responsive to the access request, the BSS 120 transmits an assignment message identifying uplink resources that have been allocated for the MS 100 uplink data transmission(s).

All MSs 100 must have a valid Timing Advance (TA) value in order to be allowed to transmit radio blocks on the uplink to the BSS 120. As will be explained in further detail below, some embodiments are directed to providing TA values to a plurality of the MSs 100 on shared radio resources in a single control plane message. The single control plane message can contain the TA values addressed to the plurality of the MSs 100 and thereby allows for reducing/minimizing the volume of control plane signalling required to support the periodic transmission of TA information to the plurality of the MSs 100 in packet transfer mode.

In some embodiments, a new control plane message is provided that includes TA values for a plurality of MSs 100. FIG. 2 is a simplified block diagram of a portion of the cellular radio communications system of FIG. 1, and illustrates a distribution timing advance message 200 that includes TA values for a plurality of the MSs 100 according to some embodiments. The distribution timing advance message 200 is periodically transmitted from the BS 122 to the plurality of the MSs 100 on a Packet Associated Control Channel (PACCH).

FIG. 3 illustrates example content of the distribution timing advance message which may be used as the message 200 of FIG. 2, and which encodes TA values for the plurality of the MSs 100. Referring to FIG. 3, the distribution timing advance message content includes a PAGE MODE value (2 bits), a Number_of_UPLINK_TFIs value (4 bits), and pairs of UPLINK_TFI values (each 5 bits) and associated TA values (TIMING_ADVANCE_VALUEs (each 6 bits)). The Number_of_UPLINK_TFIs value (4 bits) identifies how many MSs 100 are being addressed in this distribution timing advance message. The UPLINK_TFI values (each 5 bits) each provide an uplink identity for a different ones of the MSs 100. A particular MS 100 corresponding to one of the UPLINK_TFI values identifies the corresponding TIMING_ADVANCE_VALUE within the distribution timing advance message, and uses the TIMING_ADVANCE_VALUE to adjust the timing of an uplink transmission to the base station 122. The number of associated UPLINK_TFI and TIMING_ADVANCE_VALUE pairs is based on a number of the MSs 100 to which the TA values are directed (e.g., the number of pairs is equal to the number of MSs 100, or "val(Number_of_UPLINK_TFIs)+1"). The number of associated pairs can therefore be based on a number of the MSs 100 that are assigned an uplink temporary block flow on the same uplink radio frequency channel and that monitor downlink control message on at least one common timeslot.

A MS 100 would choose to read a distribution timing advance message because it realizes that it contains TA information for multiple MSs 100 for the case where it does not expect a legacy Packet Uplink Ack/Nack (PUAN) control plane message because it has no outstanding Radio Link Control (RLC) data blocks for an ongoing uplink TBF (i.e. the legacy PUAN primarily allows for providing a MS 100 with Ack/Nack information for uplink RLC data blocks transmitted by the MS 100 but not yet acknowledged by the BSS 120 and also allows for providing that MS 100 with TA information). The distribution timing advance message will not be acknowledged (since it is intended to be received by multiple MSs 100) and is sent often enough so that even if a MS 100 is unable to read a given instance it would likely be able to read the next instance (i.e. so that the risk of a MS 100 not receiving TA information within the context of a control plane message according to a minimum acceptable periodicity is quite low).

Associative pairing between the temporary flow identity values and the timing advance values for a plurality of MSs 100 is show in FIG. 4 for a more generalized distribution timing advance message, which may be used as the message 200 of FIG. 2. The distribution timing advance message encodes TA values for a number N of the MSs 100 that are assigned an uplink temporary block flow on the same uplink radio frequency channel and that monitor downlink control message on at least one common timeslot. The number of uplink TFIs is therefore N, and N pairs of the temporary flow identity values and the timing advance values are contained in the same message instance. Each of the N MSs 100 receive the timing advance message on a PACCH from the base station 122.

In the example of FIG. 4, a first MS (MS_1) would identify its temporary flow identity value (Uplink_TFI_MS_1), determine its TA value from the associated Timing_Advance_Value_1, and adjust the timing of an uplink transmission to the base station 122 responsive to the Timing_Advance_Value_1. A second MS (MS_2) would identify its temporary flow identity value (Uplink_TFI_MS_2), determine its TA value from the associated Timing_Advance_Value_2, and adjust the timing of an uplink transmission to the base station 122 responsive to the Timing_Advance_Value_2. The other MSs would operate in a same/similar manner, with the Nth MS identifying its temporary flow identity value (Uplink_TFI_MS_N), determining its TA value from the associated Timing_Advance_Value_N, and adjust the timing of an uplink transmission to the base station 122 responsive to the Timing_Advance_Value_N. In this manner, a single distribution timing advance message instance communicates TA values to a plurality N of the MSs 100 to cause the N MSs 100 to adjust the timing of their respective uplink transmissions to the base station 122 responsive to the TA values.

Figure 5:
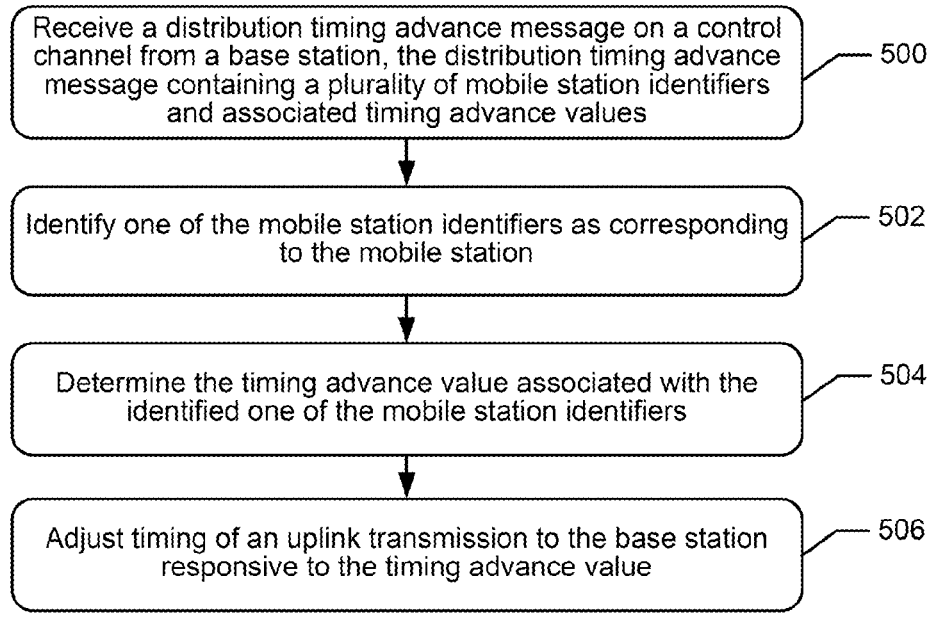
FIGS. 5-9 are flowcharts of operations and methods by a mobile station according to some embodiments.

These and further embodiments are explained further below in the context of FIGS. 5-9, which show flowcharts of operations and methods by a MS 100. FIG. 5 illustrates a method of operating the MS 100 in a packet transfer mode is configured to receive and utilize the distribution timing advance message that can contain TA values for plurality of the MSs 100. The method includes receiving (block 500) a distribution timing advance message on a control channel (e.g., the PACCH) from a base station 122. The distribution timing advance message contains a plurality of mobile station identifiers and associated timing advance values. The one of the mobile station identifiers is identified (block 502) as corresponding to the mobile station 100. The timing advance value associated with the identified one of the mobile station identifiers is determined (block 504). The timing of an uplink transmission to the base station 122 is adjusted (block 506) responsive to the timing advance value.

The mobile station identifiers may be temporary flow identity values, and the distribution timing advance message can include a plurality of associated pairs of temporary flow identity values and the timing advance values (e.g., as shown in FIGS. 3 and 4).

Because legacy MSs may not be configured to receive and properly utilize timing advance message that contain TA values for plurality of the MSs 100, a MS 100 can be configured to include information in a message that identifies that the MS 100 is capable of receiving and determining a distribution timing advance value using a timing advance message which contains a plurality of mobile station identifiers and associated timing advance values. As will be explained in further detail below, the MS 100 may communicate this message containing capability information to the BSS 120 and/or to a Serving General Packet Radio Service (GPRS) Support Node (SGSN), such as the SGSN 130 shown in FIG. 1. When the message containing capability information is communicated from the MS 100 to the SGSN 130, the BSS 120 can obtain this capability information from the SGSN 130. The BSS 120 uses this MS 100 capability indication to decide to include a timing advance value for that MS 100 within a distribution timing advance message which also contains timing advance values tier other MSs 100 that have also already indicated that they are capable of receiving and identifying their respective timing advance values within such message.

As is well know in the art, the SGSN 130 can be responsible for the delivery of data packets (also known as LLC PDUs) from and to the MSs 100 within its geographical service area. Tasks of the SGSN 130 can include packet routing and transfer, mobility management (attach/detach and location management), logical link management, and authentication and charging functions.

Figure 6:
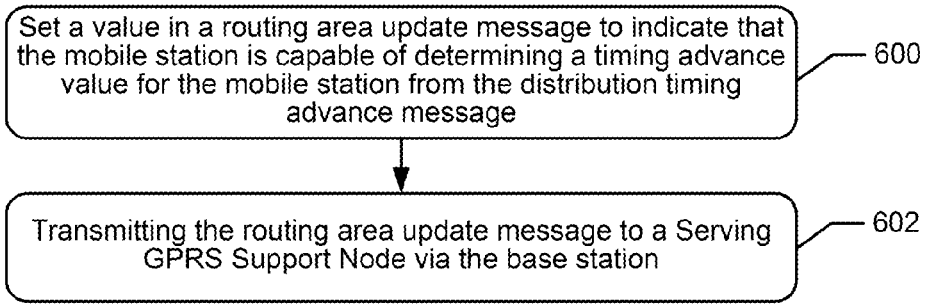

One approach that the MS 100 can use to indicate its capability is shown in FIG. 6. The MS 100 sets (block 600) a value in a routing area update message to indicate that the MS 100 is capable of determining a timing advance value for the MS 100 from a distribution timing advance message which contains a plurality of mobile station identifiers and associated timing advance values. The MS 100 transmits (block 602) the routing area update message to the SGSN 130 via the base station 122. As will be explained in further detail below, in this embodiment the BSS 120 can obtain the capability indication value for the MS 100 from the SGSN 130.

Figure 7:
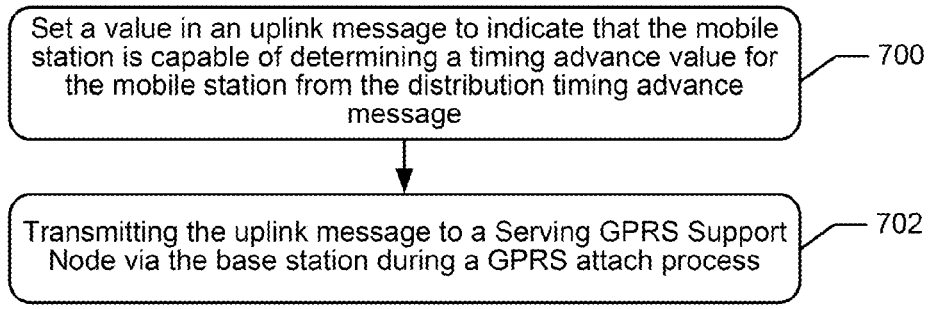

Another approach that the MS 100 can use to indicate its capability is shown in FIG. 7. The MS 100 sets (block 700) a value in an uplink message to indicate that the MS 100 is capable of determining a timing advance value for the MS 100 from a distribution timing advance message which contains a plurality of mobile station identifiers and associated timing advance values. The MS 100 transmits (block 702) the uplink message to the SGSN 130 via the base station 122 during a GPRS attach process. As will be explained in further detail below, in this embodiment the BSS 120 can obtain the capability indication value for the MS 100 from the SGSN 130.

Figure 8:
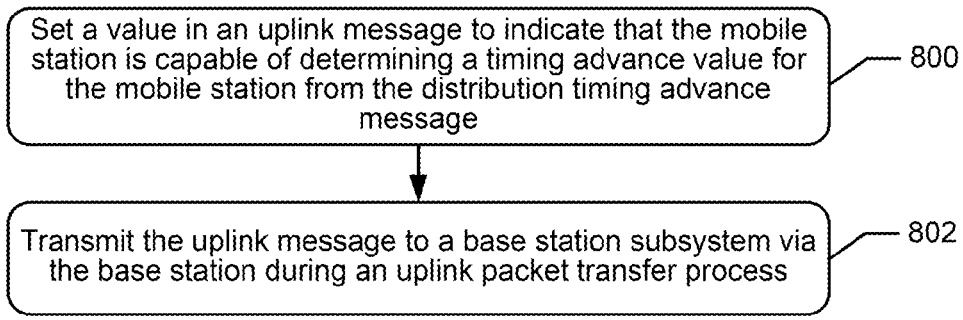

Another approach that the MS 100 can use to indicate its capability is shown in FIG. 8. The MS 100 sets (block 800) a value in an uplink message to indicate that the MS 100 is capable of determining a timing advance value for the MS 100 from a distribution timing advance message which contains a plurality of mobile station identifiers and associated timing advance values. The MS 100 transmits (block 802) the uplink message to the BSS 120 via the base station 122 during an uplink packet transfer process.

Figure 9:
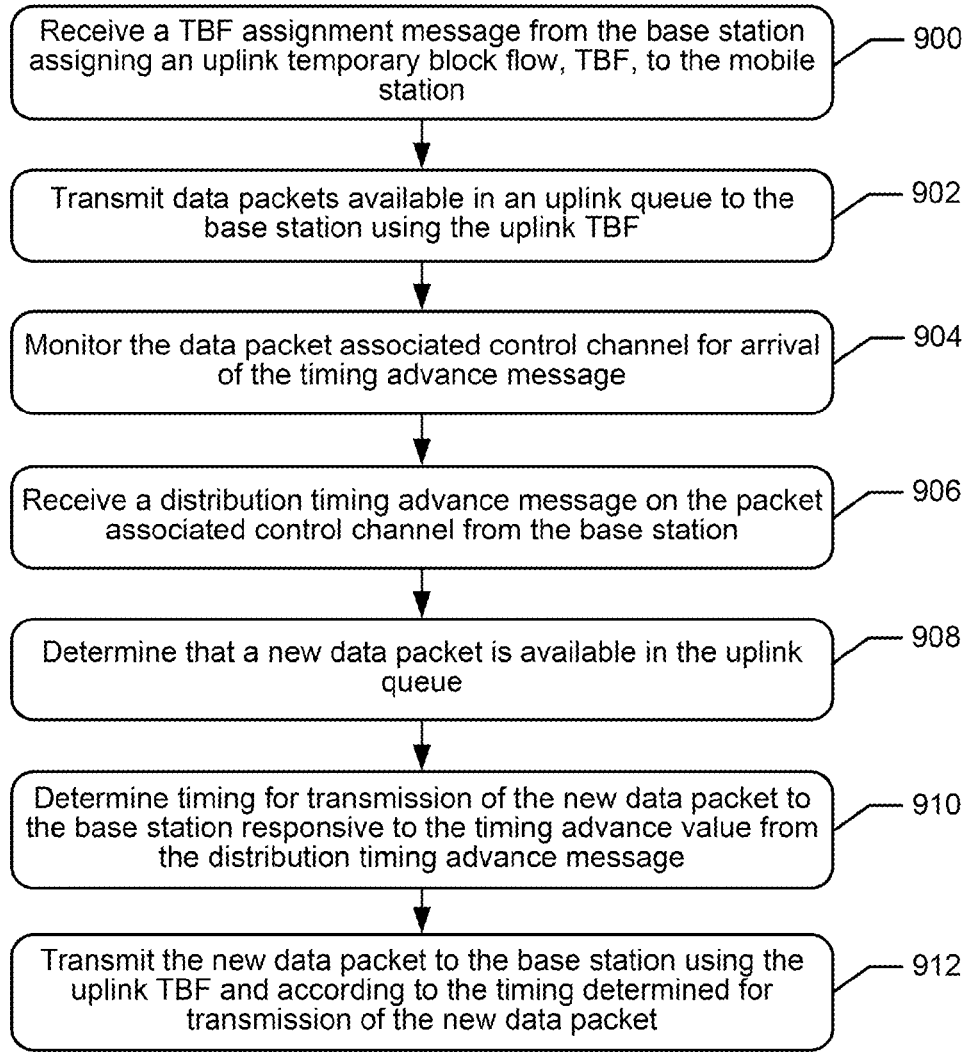

Further operations of the MS 100 to receive and operate on the TA value received in the distribution timing advance message as shown in FIG. 9. Referring to FIG. 9, the MS 100 receives (block 900) a temporary block flow (TBF) assignment message from the BS 122 assigning an uplink TBF to the MS 100. The MS 100 transmits (block 902) data packets available in an uplink queue to the BS 122 using the uplink TBF. The MS 100 monitors (block 904) the downlink packet associated control channel on one or more downlink timeslots (e.g. the downlink timeslots corresponding to the uplink timeslots assigned for the uplink TBF) for arrival of the distribution timing advance message. The MS 100 receives (block 906) a distribution timing advance message on the packet associated control channel from the BS 122. The distribution timing advance message contains a mobile station identifier corresponding to the MS 100 and identifying the associated timing advance value. The MS 100 determines (block 908) that a new data packet is available in the uplink queue. The MS 100 determines (block 910) the timing to be used for transmission of the new data packet to the BS 122 responsive to the timing advance value from the timing advance message. The MS 100 then transmits (block 912) the new packet to the BS 122 using the uplink TBF and the timing advance determined for transmission of the new packet.

Figure 10:
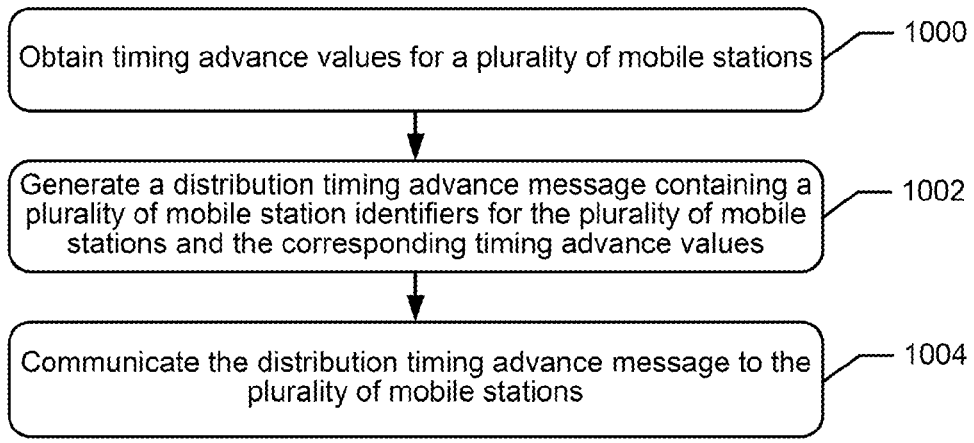
FIGS. 10-12 are flowcharts of operations and methods by a base station subsystem according to some embodiments.
Figure 11:
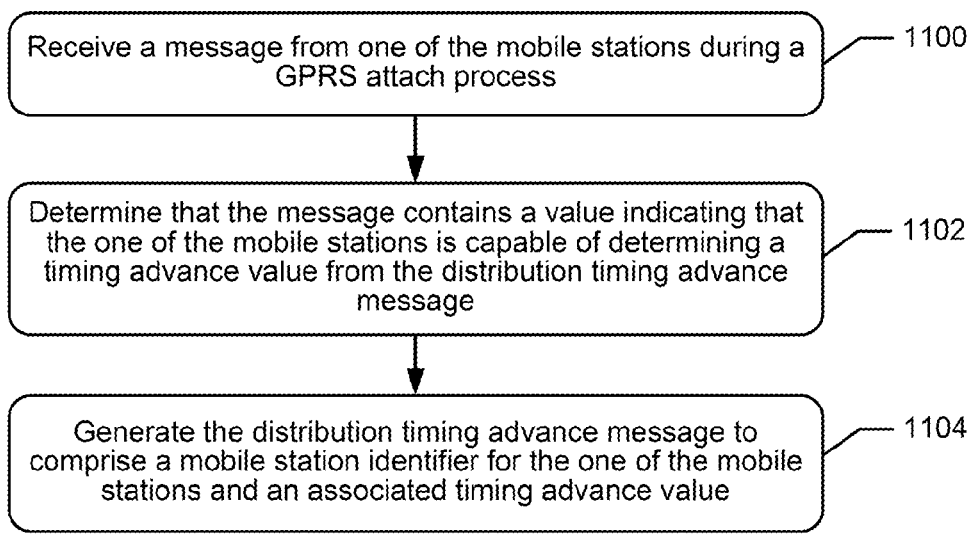
Figure 12:
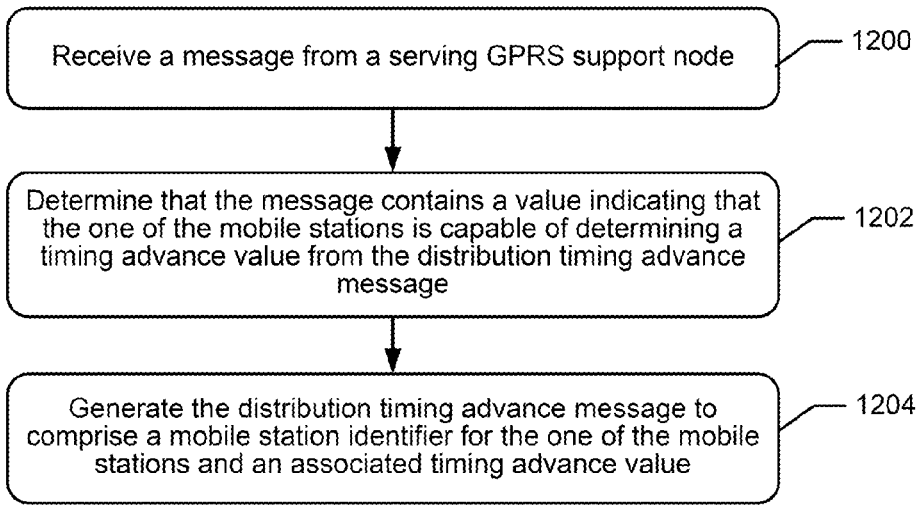

Corresponding operations and methods by the BSS 120 to communicate timing advance values to a plurality of mobile stations 100 are illustrated in the flowcharts of FIGS. 10-12 according to some embodiments.

Referring to FIG. 10, the BSS 120 obtains (block 1000) timing advance values for the plurality of MSs 100. The BSS 120 generates (block 1002) a distribution timing advance message containing a plurality of mobile station identifiers for the plurality of MSs 1.00 and the corresponding timing advance values. The BSS 120 communicates (block 1004) the timing advance message to the plurality of MSs 100.

As explained above, the mobile station identifiers can he temporary flow identity values, and the timing advance message can include a plurality of associated pairs of temporary flow identity values and the timing advance values.

The number of the plurality of pairs of the temporary flow identity values and the timing advance values that are included in a same distribution timing advance message can be based on a number of the MSs 100 that are assigned an uplink temporary block flow on the same uplink radio frequency channel and that monitor downlink control messages on at least one common timeslot.

FIG. 11 illustrates one approach that the BSS 120 can use to determine whether particular ones of the MSs 100 are capable of determining their timing advance values from among a plurality of timing advance values for different MSs contained in a same distribution timing advance message. The BSS 120 receives (block 1100) a message from one of the MSs 100 during a GPRS attach process. The BSS 120 determines (block 1102) that the message contains a value indicating that the one of the MSs 100 is capable of determining a timing advance value from the distribution timing advance message containing a plurality of mobile station identifiers and associated timing advance value, and, based on this determination, generates (block 1104) the distribution timing advance message to comprise a mobile station identifier for the one of the MSs 100 and an associated timing advance value.

As explained above a MS 100 can set a value in a routing area update message and/or an uplink message that is transmitted to the SGSN 130 to indicate that it is capable of determining its timing advance value from among a plurality of timing advance values for different MSs contained in a same distribution timing advance message. FIG. 12 illustrates another approach that the BSS 120 can use to determine capabilities of the MSs 100 the use the timing advance message disclosed herein. Referring to FIG. 12, the BSS 120 receives (block 1200) a message from a SGSN 130, and determines (block 1202) that the message contains a value indicating that one of the MS 100 is capable of determining a timing advance value from the distribution timing advance message containing a plurality of mobile station identifiers and associated timing advance values. The BSS 120 then generates (block 1204) the distribution timing advance message to comprise a mobile station identifier for the one of the MS 100 and an associated timing advance value.

Figure 13:
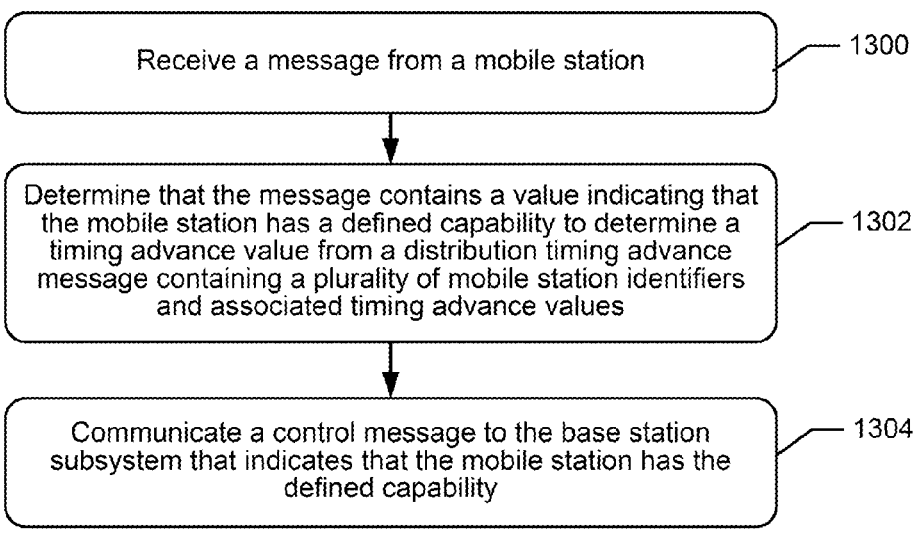
FIG. 13 is a flowchart of operations and methods by a Serving GPRS Support Node according to some embodiments.

Corresponding operations and methods by the SGSN 130 to receive capability information from a MS 100 and forward the capability information to the BSS 120 are illustrated in FIG. 13 according to some embodiments. A method of operating a SGSN 130 to control communication of timing advance values by a BSS 120 to a plurality of MSs 100 can include receiving (block 1300) a message from a MS 1.00. The SGSN 130 determines (block 1302) that the message contains a value indicating that the MS 100 has a defined capability to determine a timing advance value from a distribution timing advance message containing a plurality of mobile station identifiers and associated timing advance values. The SGSN 130 communicates (block 1304) a control message to the BSS 120 that indicates that the MS 100 has the defined capability. As explained above, the message received from the MS 100 may be a routing area update message. Alternatively or additionally, the message received from the MS 100 may be a GPM attach message.

Although terminology from 3GPP ($3^{rd}$ Generation Partnership Project) standards is used in this disclosure to exemplify embodiments of inventive concepts, this terminology should not limit the scope of inventive concepts to only these systems. Other wireless systems, including LTE (Long Term Evolution), WCDMA (Wideband Code Division Multiple Access), WiMax (Worldwide interoperability for Microwave Access), UMB (Ultra Mobile Broadband), HSDPA (High- Speed Downlink Packet Access), GSM (Global System for Mobile Communications), etc., may also benefit from exploiting embodiments of present inventive concepts disclosed herein.

Also note that terminology such as base station subsystem (e.g., BSS, base station, NodeB, eNodeB, or Evolved Node B) and mobile station (e.g., MS, wireless terminal, UE, or User Equipment) should be considering non-limiting and does not imply a certain hierarchical relation between the two. In general, a base station subsystem (e.g., a BSS) and a mobile station (e.g., an MS) are considered as examples of respective different communications devices that communicate with each other over a wireless radio channel.

Figure 14:
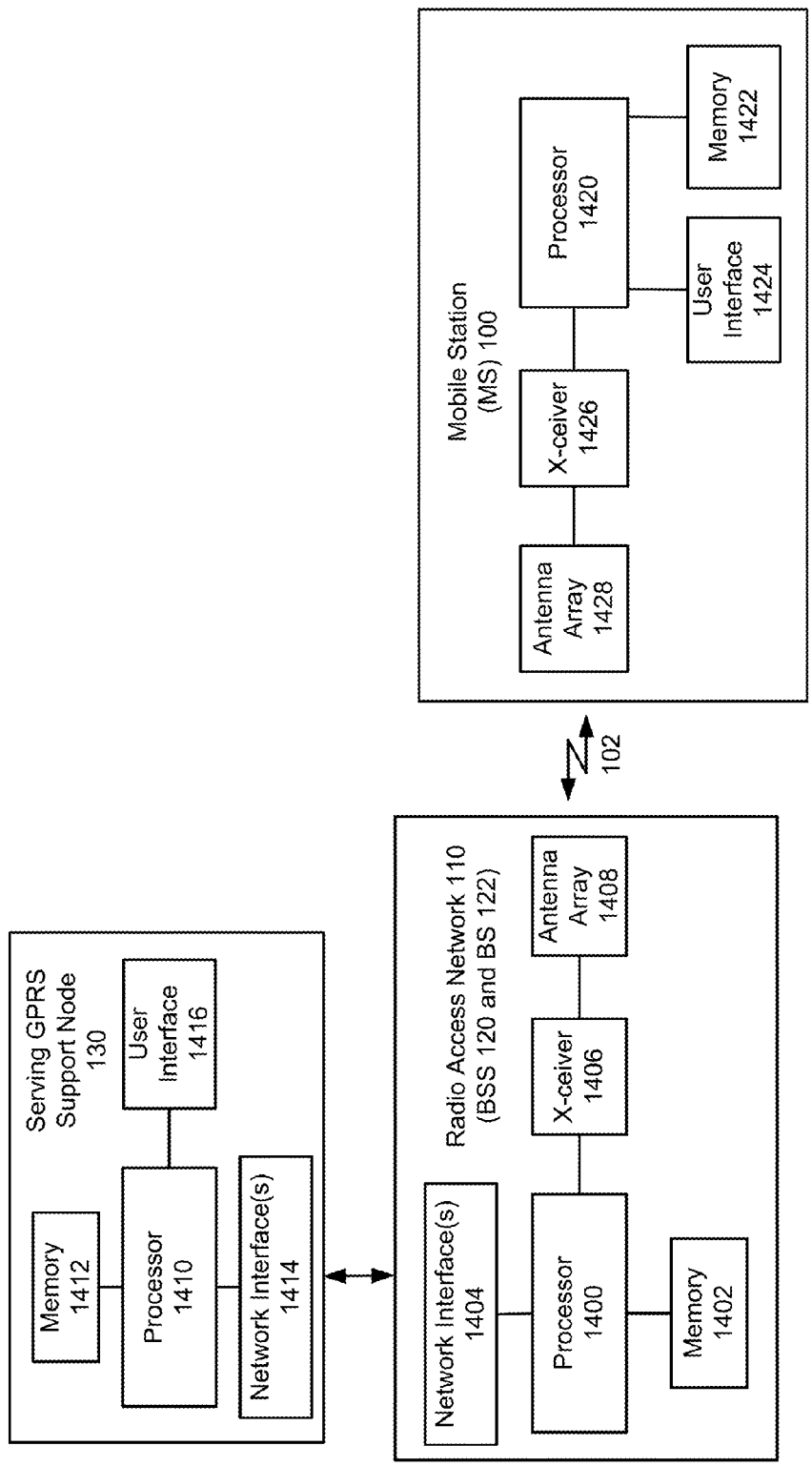
FIG. 14 is a block diagram illustrating a mobile station, a radio access network, and a Serving GPRS Support Node according to some embodiments.

FIG. 14 is a block diagram illustrating a MS 100, a radio access network (RAN) 110, and a SGSN 130 according to some embodiments. The MS 100 and the RAN 110 are configured to communicate over wireless channels 102 according to some embodiments. The MS 100 can include transceiver 1426 coupled between antenna array 1428 and processor 1420, and user interface 1424 coupled to processor 1420, and memory 1422 coupled to processor 1420. The MS 100 may also include a display device, an input interface (e.g., keyboard, touch sensitive display, keypad, voice recognition, etc.), and a speaker. The processor 1420 may include one or more instruction execution circuits, such as a general purpose processor and/or special purpose processor (e.g., microprocessor and/or digital signal processor) that may be collocated (e.g., within a same circuit package, connected to a same backplane, enclosed within a same computer housing, etc) or distributed across one or more data networks. The processor 1420 is configured to execute computer program instructions from the memory 1422, described below as a computer readable medium, to perform at least some of the operations and methods described herein as being performed by a MS.

The RAN 110 can include the BSS 120 and the BS 122. Although the BSS 120 and BS 122 are illustrated as sharing hardware resources within the RAN 110, in practice they would typically be physically separate devices (with separate hardware resources) that are communicatively networked together. The RAN 110 can include transceiver 1406 coupled between antenna array 1408 and processor 1400, a memory 1402 coupled to processor 1400, and a network interface 1404 coupled to the processor 1400. The RAN 110 may also include a display device, an input interface (e.g., keyboard, touch sensitive display, keypad, voice recognition, etc.), and a speaker. The processor 1400 may include one or more instruction execution circuits, such as a general purpose processor and/or special purpose processor (e.g., microprocessor and/or digital signal processor) that may be collocated (e.g., within a same circuit package, connected to a same backplane, enclosed within a same computer housing, etc) or distributed across one or more data networks. The processor 1400 is configured to execute computer program instructions from the memory 1402, described below as a computer readable medium, to perform at least some of the operations and methods described herein as being performed by the BSS 120 and/or the BS 122.

The SGSN 130 can include a network interface 1414 (which communicates with the network interface 1404 of the RAN 110), a memory 1412, and a user interface 1416 which may include a display device, an input interface (e.g., keyboard, touch sensitive display, keypad, voice recognition, etc.), and a speaker, which are collectively coupled to a processor 1410. The processor 1410 may include one or more instruction execution circuits, such as a general purpose processor and/or special purpose processor (e.g., microprocessor and/or digital signal processor) that may be collocated (e.g., within a same circuit package, connected to a same backplane, enclosed within a same computer housing, etc) or distributed across one or more data networks. The processor 1410 is configured to execute computer program instructions from the memory 1412, described below as a computer readable medium, to perform at least some of the operations and methods described herein as being performed by the SGSN 130 122.

Abbreviations:

A list of abbreviations used in the present disclosure is provided below for ease of reference of the reader:

3GPP Third Generation Partnership Project
BSC Base Station Controller
BSS Base Station Subsystem
eNodeB E-UTRAN NodeB
GPRS General Packet Radio Service
IE Information Element
LLC Logical Link Control
MS Mobile Station
PACCH Packet Associated Control Channel
PICU Packet Data Unit
PS Packet Switched
PUAN Packet Uplink Ack/Nack
RLC Radio Link Control
SGSN Serving GPRS Support Node
SGW Serving Gateway
TA Timing Advance
TBF Temporary Block Flow
UE User Equipment Further Definitions and Embodiments:

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM. or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method of operating a mobile station in a packet transfer mode, the method comprising:
receiving a temporary block flow (TBF) assignment message from a base station assigning an uplink TBF to the mobile station;
transmitting data packets available in an uplink queue to the base station using the uplink TBF;
monitoring a downlink packet associated control channel for arrival of a distribution timing advance message;
receiving the distribution timing advance message on the downlink packet associated control channel from the base station, the distribution timing advance message containing a plurality of mobile station identifiers and associated timing advance values;
determining that a new data packet is available in the uplink queue;
identifying one of the plurality of mobile station identifiers as corresponding to the mobile station;
determining the timing advance value associated with the identified one of the plurality of mobile station identifiers for use for transmission of the new data packet to the base station;
adjusting the timing of an uplink transmission to the base station responsive to the timing advance value: and
transmitting the new data packet to the base station using the uplink TBF and the timing advance value determined for transmission of the new data packet.

2. The method of claim 1, wherein:
the mobile station identifiers are temporary flow identity values; and
the distribution timing advance message comprises a plurality of associated pairs of temporary flow identity values and timing advance values.

3. The method of claim 1, further comprising:
setting a value in a routing area update message to indicate that the mobile station is capable of determining a timing advance value for the mobile station from a distribution timing advance message which contains a plurality of mobile station identifiers and associated timing advance values; and transmitting the routing area update message to a serving GPRS support node via the base station.

4. The method of claim 1, further comprising:
setting a value in an uplink message to indicate that the mobile station is capable of determining a timing advance value for the mobile station from a distribution timing advance message which contains a plurality of mobile station identifiers and associated timing advance values; and
transmitting the uplink message to a serving GPRS support node via the base station during a GPRS attach process.

5. The method of claim 1, further comprising:
setting a value in an uplink message to indicate that the mobile station is capable of determining a timing advance value for the mobile station from a distribution timing advance message which contains a plurality of mobile station identifiers and associated timing advance values; and
transmitting the uplink message to a base station subsystem via the base station during an uplink packet transfer process.

6. A mobile station comprising:
at least one processor; and
at least one memory coupled to the at least one processor and comprising computer readable program code embodied in the at least one memory that when executed by the at least one processor causes the at least one processor to perform operations comprising:
receiving a temporary block flow (TBF) assignment message from a base station assigning an uplink TBF to the mobile station;
transmitting data packets available in an uplink queue to the base station using the uplink TBF;
monitoring a downlink packet associated control channel for arrival of a distribution timing advance message;
receiving the distribution timing advance message on the downlink packet associated control channel from the base station, the distribution timing advance message containing a plurality of mobile station identifiers and associated timing advance values;
determining that a new data packet is available in the uplink queue;
identifying one of the plurality of mobile station identifiers as corresponding to the mobile station;
determining the timing advance value associated with the identified one of the plurality of mobile station identifiers for use for transmission of the new data packet to the base station;
adjusting the timing of an uplink transmission to the base station responsive to the timing advance value; and
transmitting the new data packet to the base station using the uplink TBF and the timing advance value determined for transmission of the new data packet.

7. The mobile station of claim 6, wherein:
the mobile station identifiers are temporary flow identity values; and
the timing advance message comprises a plurality of associated pairs of temporary flow identity values and timing advance values.

8. The mobile station of claim 6, further comprising computer readable program code embodied in the at least one memory that when executed by the at least one processor causes the at least one processor to perform operations comprising:

setting a value in a routing area update message to indicate that the mobile station is capable of determining a timing advance value for the mobile station from a distribution timing advance message which contains a plurality of mobile station identifiers and associated timing advance values; and
transmitting the routing area update message to a Serving GPRS Support Node via the base station.

9. The mobile station of claim 6, further comprising computer readable program code embodied in the at least one memory that when executed by the at least one processor causes the at least one processor to perform operations comprising:
setting a value in an uplink message to indicate that the mobile station is capable of determining a timing advance value for the mobile station from a distribution timing advance message which contains a plurality of mobile station identifiers and associated timing advance values; and
transmitting the uplink message to a serving GPRS support node via the base station during a GPRS attach process.

10. The mobile station of claim 6, further comprising computer readable program code embodied in the at least one memory that when executed by the at least one processor causes the at least one processor to perform operations comprising:
setting a value in an uplink message to indicate that the mobile station is capable of determining a timing advance value for the mobile station from a distribution timing advance message which contains a plurality of mobile station identifiers and associated timing advance values; and
transmitting the uplink message to a base station subsystem via the base station during an uplink packet transfer process.

11. A method of operating a base station subsystem to communicate timing advance values to a plurality of mobile stations, the method comprising:
transmitting a temporary block flow (TBF) assignment message assigning an uplink TBF to the plurality of mobile stations;
receiving data packets using the uplink TBF;
obtaining timing advance values for the plurality of mobile stations;
generating a distribution timing advance message containing a plurality of mobile station identifiers for the plurality of mobile stations and the corresponding timing advance values;
communicating the distribution timing advance message on a downlink packet associated control channel to the plurality of mobile stations; and
receiving a new data packet transmitted from one of the plurality of mobile stations with timing of the transmission adjusted responsive to the timing advance value corresponding to the mobile station identifier corresponding to the one of the plurality of mobile stations.

12. The method of claim 11, wherein:
the mobile station identifiers are temporary flow identity values; and
the timing advance message comprises a plurality of associated pairs of temporary flow identity values and timing advance values.

13. The method of claim 12, wherein:
a number of the plurality of associated pairs of the temporary flow identity values and the timing advance values is based on a number of the mobile stations that are assigned an uplink temporary block flow on the same uplink radio frequency channel and that monitor downlink control messages on at least one common timeslot.

14. The method of claim 12, further comprising:
receiving a message from one of the mobile stations during a GPRS attach process;
determining that the message contains a value indicating that the one of the mobile stations is capable of determining a timing advance value from the distribution timing advance message containing a plurality of mobile station identifiers and associated timing advance values; and
generating the timing advance message to comprise a mobile station identifier for the one of the mobile stations and an associated timing advance value.

15. The method of claim 12, further comprising:
receiving a message from a serving GPRS support node;
determining that the message contains a value indicating that one of the mobile stations is capable of determining a timing advance value from the distribution timing advance message containing a plurality of mobile station identifiers and associated timing advance values; and
generating the timing advance message to comprise a mobile station identifier for the one of the mobile stations and an associated timing advance value.

16. A base station subsystem comprising:
at least one processor; and
at least one memory coupled to the at least one processor and comprising computer readable program code embodied in the at least one memory that when executed by the at least one processor causes the at least one processor to perform operations comprising:
   transmitting a temporary block flow (TBF) assignment message assigning an uplink TBF to the plurality of mobile stations;
   receiving data packets using the uplink TBF;
   obtaining timing advance values for the plurality of mobile stations;
   generating a distribution timing advance message containing a plurality of mobile station identifiers for the plurality of mobile stations and the corresponding timing advance values;
   communicating the distribution timing advance message on a downlink packet associated control channel to the plurality of mobile stations; and
   receiving a new data packet transmitted from one of the plurality of mobile stations with timing of the transmission adjusted responsive to the timing advance value corresponding to the mobile station identifier corresponding to the one of the plurality of mobile stations.

17. The base station subsystem of claim 16 wherein:
the mobile station identifiers are temporary flow identity values; and
the distribution timing advance message comprises a plurality of associated pairs of temporary flow identity values and timing advance values.

18. The base station subsystem of claim 17 wherein:
a number of the plurality of associated pairs of the temporary flow identity values and the timing advance values is based on a number of the mobile stations that are assigned an uplink temporary block flow on the same uplink radio frequency channel and that monitor downlink control messages on at least one common timeslot.

19. The base station subsystem of claim 17, further comprising computer readable program code embodied in the at least one memory that when executed by the at least one processor causes the at least one processor to perform operations comprising:
receiving a message from one of the mobile stations during a GPRS attach process;
determining that the message contains a value indicating that the one of the mobile stations is capable of determining a timing advance value from the distribution timing advance message containing a plurality of mobile station identifiers and associated timing advance values; and
generating the distribution timing advance message to comprise a mobile station identifier for the one of the mobile stations and an associated timing advance value.

20. The base station subsystem of claim 17, further comprising computer readable program code embodied in the at least one memory that when executed by the at least one processor causes the at least one processor to perform operations comprising:
receiving a message from a serving GPRS support node;
determining that the message contains a value indicating that one of the mobile stations is capable of determining a timing advance value from the distribution timing advance message containing a plurality of mobile station identifiers and associated timing advance values; and
generating the distribution timing advance message to comprise a mobile station identifier for the one of the mobile stations and an associated timing advance value.

* * * * *